UNITED STATES PATENT OFFICE.

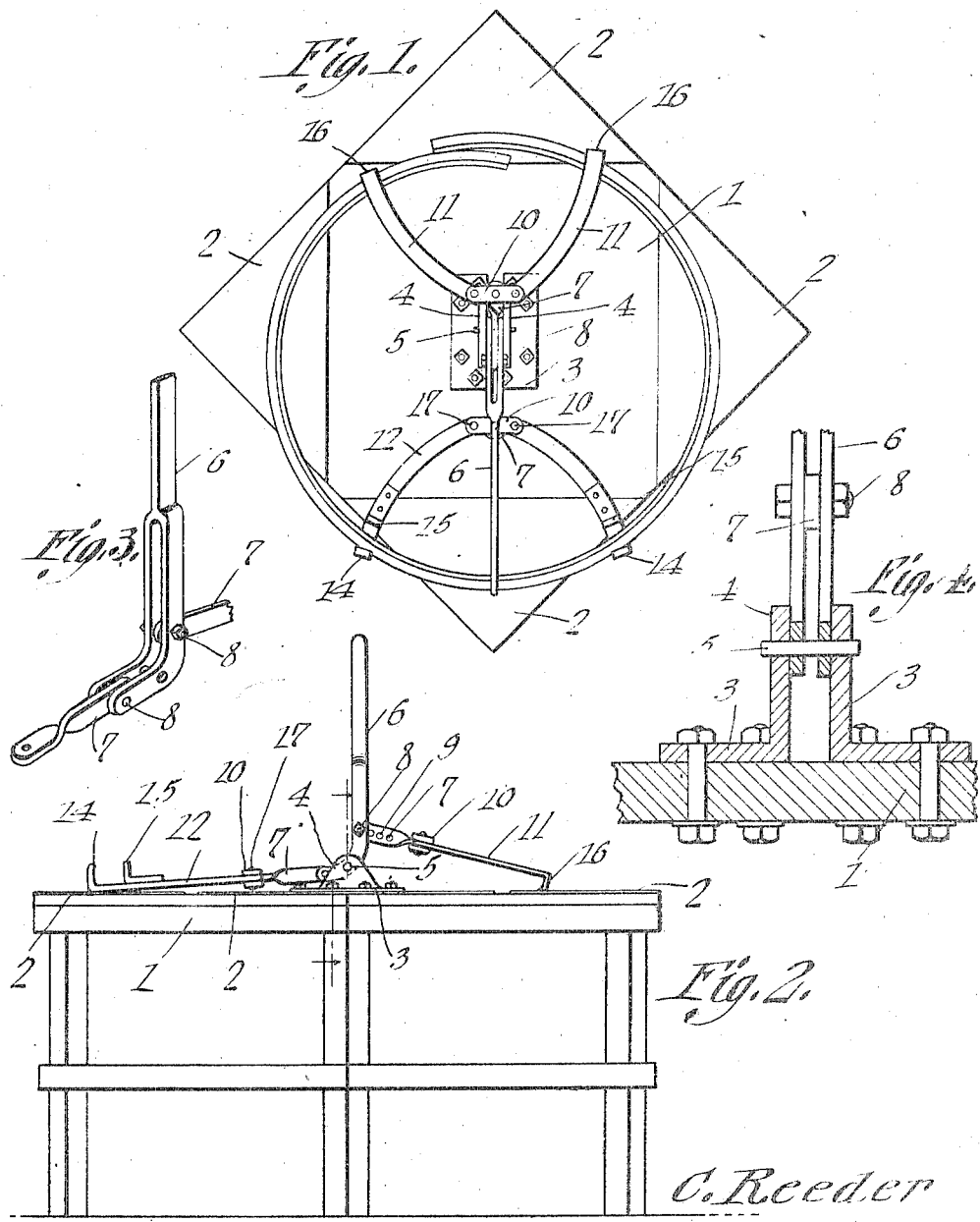

CHARLES REEDER, OF EPHRATA, WASHINGTON.

TIRE-EXPANDER.

1,303,497.

Specification of Letters Patent.

Patented May 13, 1919.

Application filed October 22, 1918. Serial No. 259,178.

*To all whom it may concern:*

Be it known that I, CHARLES REEDER, a citizen of the United States, residing at Ephrata, in the county of Grant and State of Washington, have invented a new and useful Tire-Expander, of which the following is a specification.

The device forming the subject matter of this application is adapted to be employed for expanding and contracting a demountable rim for a vehicle wheel, it being a matter of common knowledge that the expansion and contraction of such an article is an operation brought about with difficulty, in the absence of some suitable manipulating means.

The invention aims to provide novel means whereby the rim may be supported and whereby the rim may be expanded and contracted.

With the above and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings:—

Figure 1 is a top plan;

Fig. 2 is a side elevation;

Fig. 3 is a perspective showing the lever and attendant parts;

Fig. 4 is a vertical section through the base, parts being omitted and parts appearing in elevation.

In carrying out the invention there is provided a base 1 of sufficient size to support the rim which is to be manipulated. At some or all of the corners of the base 1, the same is provided with wear plates 2 which support the rim during the expansion and contraction thereof. Fulcrum members 3 are attached to the base 1 near to the center of the base and are provided with ears 4 carrying a pin 5 on which an angular lever 6 is fulcrumed intermediate its ends. Links 7 are attached by pivot elements 8 to the lever 6 on opposite sides of its fulcrum 5, one of the links having a plurality of openings 9, adapted to receive the corresponding pivot element, so that the structure may be made to accommodate rims of different sizes. The outer ends of the links 7 carry transverse heads 10 to which arms 11 and 12 are pivoted for swinging movement in a plane at right angles to the plane in which the links 7 swing, the pivotal mountings for the arms 12 being denoted by the numeral 17. The arms 12 have outer fingers 14 and inner fingers 15, whereas the arms 11 have outer fingers 16, only, the fingers 16 projecting in an opposite direction to that in which the fingers 14 and 15 project.

In practical operation, the rim which is to be manipulated is laid on the base 1, in contact with wear plates 2. The ends of the rim are engaged by the fingers 16, the intermediate portion of the rim being located between the fingers 14 and 15. When the lever 6 is manipulated, the ends of the rim, obviously, will be drawn inwardly, thus effecting a contraction of the rim. If desired, however, the fingers 16 may be placed inside of the rim, and then the device may be used to expand the rim.

Having thus described the invention, what is claimed is:—

1. In a device for manipulating wheel rims, a base of sufficient size to support the rim; a lever; means for fulcruming the lever on the base adjacent to the center of the base; links assembled with the lever on opposite sides of its fulcrum; and arms pivoted to the links, the arms having tire-engaging fingers.

2. In a device for manipulating wheel rims, a base of sufficient size to support the rim; a lever; means for fulcruming the lever intermediate its ends on the base adjacent the center of the base; links pivoted to the lever on opposite sides of the fulcrum of the lever; and arms pivoted to the links for swinging movement in a direction at right angles to the plane in which the lever swings, the arms having rim-engaging means.

3. In a device for manipulating wheel rims, a base of sufficient size to support the rim; a lever fulcrumed intermediate its ends on the base for swinging movement in a direction at right angles to the plane defined by the base; oppositely extended rim-engaging members; and means for pivotally connecting said members with the lever, on opposite sides of the fulcrum of the lever.

In testimony that I claim the foregoing as my own, I have hereto affixed my signature in the presence of two witnesses.

CHARLES REEDER.

Witnesses:
W. G. MOORE,
WM. A. TERRY, Sr.